US011927055B2

(12) United States Patent
Janick et al.

(10) Patent No.: US 11,927,055 B2
(45) Date of Patent: Mar. 12, 2024

(54) VERTICALLY STACKING PANEL DOOR WITH A LIFTING CAM

(71) Applicant: CornellCookson, LLC, Mountain Top, PA (US)

(72) Inventors: James Janick, Shavertown, PA (US); Thomas Balay, Drums, PA (US); Brandon C. Smith, Wapwallopen, PA (US)

(73) Assignee: CornellCookson, LLC, Mountain Top, PA (US)

( * ) Notice: Subject to any disclaimer, the term of this patent is extended or adjusted under 35 U.S.C. 154(b) by 583 days.

(21) Appl. No.: 17/062,840

(22) Filed: Oct. 5, 2020

(65) Prior Publication Data

US 2022/0106831 A1 Apr. 7, 2022

(51) Int. Cl.
*E05F 15/686* (2015.01)
*E06B 9/06* (2006.01)

(52) U.S. Cl.
CPC .......... *E06B 9/0676* (2013.01); *E05F 15/686* (2015.01); *E06B 9/0638* (2013.01); *E05Y 2900/106* (2013.01)

(58) Field of Classification Search
CPC ........ E06B 9/0676; E06B 9/0638; E06B 3/52; E05F 15/686; E05F 15/684; E05Y 2900/106; F16H 27/10; F16H 27/08; F16H 27/06; F16H 27/045; F16H 27/04
See application file for complete search history.

(56) References Cited

U.S. PATENT DOCUMENTS

| | | | | | |
|---|---|---|---|---|---|
| 84,041 | A * | 11/1868 | Woodward | E06B 9/26 | 160/35 |
| 240,232 | A * | 4/1881 | Church | E05F 15/20 | 160/5 |
| 285,090 | A * | 9/1883 | Welker | E04B 2/74 | 49/73.1 |
| 1,317,232 | A * | 9/1919 | Spillman | F16H 55/18 | 74/440 |
| 3,094,195 | A * | 6/1963 | Lund | F16D 15/00 | 188/134 |
| 3,280,888 | A | 10/1966 | Davis | | |
| 3,496,791 | A * | 2/1970 | Gabriel | F16H 27/04 | 74/411 |

(Continued)

FOREIGN PATENT DOCUMENTS

| | | | |
|---|---|---|---|
| DE | 19519529 | C1 * | 6/1996 |
| DE | 10 201 513 | A1 | 1/2003 |
| EP | 1234946 | | 8/2002 |

OTHER PUBLICATIONS

International Search Report and Written Opinion mailed in corresponding PCT/US2021/053307 dated Jan. 18, 2022, 7 pages.

*Primary Examiner* — Abe Massad

(57) ABSTRACT

In example implementations, a horizontal door guide for a vertically stacking door is provided. The horizontal door guide includes a first track and a second track to vertically stack panels of a door along a horizontal line, a drive shaft coupled to a bottom most panel to lift the door vertically, a Geneva drive shaft coupled to the drive shaft, and a lifting cam coupled to the Geneva drive shaft, wherein the lifting cam comprises a rotating lever to separate and lift adjacent panels of the door as the door is opened in a vertical direction by the drive shaft and to push panels into the first track and the second track.

14 Claims, 9 Drawing Sheets

(56) References Cited

U.S. PATENT DOCUMENTS

| | | | | |
|---|---|---|---|---|
| 3,757,845 | A | 9/1973 | Pagliaro | |
| 4,139,042 | A * | 2/1979 | Watanabe | E06B 9/0638 160/36 |
| 4,606,235 | A * | 8/1986 | Kindt | F16H 55/17 74/113 |
| 5,065,806 | A | 11/1991 | Kondoh | |
| 5,133,398 | A * | 7/1992 | Yang | E06B 9/0638 160/202 |
| 5,172,742 | A * | 12/1992 | Iwasaki | E06B 9/0638 160/32 |
| 5,927,368 | A | 7/1999 | Rohrer et al. | |
| 8,468,751 | B2 * | 6/2013 | Williams | E05F 15/684 52/64 |
| 8,869,450 | B2 | 10/2014 | Balay et al. | |
| 2002/0084041 | A1 * | 7/2002 | Craig | E06B 9/0638 160/133 |
| 2002/0104624 | A1 | 8/2002 | Reimer et al. | |
| 2004/0103997 | A1 | 6/2004 | Mullet | |
| 2005/0126721 | A1 * | 6/2005 | Fan | E05D 15/26 160/201 |
| 2006/0175027 | A1 | 8/2006 | Langenbach | |
| 2012/0285090 | A1 * | 11/2012 | Williams | E04B 2/827 49/73.1 |
| 2016/0265260 | A1 | 9/2016 | Balay et al. | |

* cited by examiner

VERTICALLY STACKING PANEL DOOR WITH A LIFTING CAM

BACKGROUND

Vertically moving doors can be used for a variety of applications. For example, vertically moving doors can be used as garage doors in residential locations or doors for bays and entrances to warehouses in commercial locations.

Some vertically moving doors can be pulled open by a motor along a track. Typically the moving doors can be moved along a track as a single piece to lay horizontally with the floor along the track.

DETAILED DESCRIPTION

Examples described herein provide examples of a vertically stacking panel door system that uses a lifting cam. As discussed above, currently available vertically moving doors are pulled along a track by a motor in a track. The door lies horizontally or parallel with the floor in a single piece.

However, there are some instances where customers would like more clearance in the area above the floor where the single piece door would rest when opened. For example, the single piece door may limit the amount of vertical clearance in the garage, commercial loading dock, and the like.

The present disclosure provides a vertically stacking panel door system with a lifting cam that can separate and stack panels of the door in a relatively small space above the door opening. A horizontal door guide of the present disclosure may include a lifting cam that includes a lever that can rotate. The rotational movement of the lever may allow the lever to be inserted between two adjacent panels as the door is being opened. The rotation of the lever may lift and separate the adjacent panels. As the lever continues to rotate, the higher panel may be pushed horizontally into the tracks of the horizontal door guide.

The panels may be fitted with end caps that include track wheels and/or a pin. The lever may contact a bar of the track wheels or the pin as leverage to lift, separate, and push the panels of the door. The end caps and track wheels may be designed to minimize noise during stacking and to maintain an aligned position as the door is opened and closed.

Figure 1:
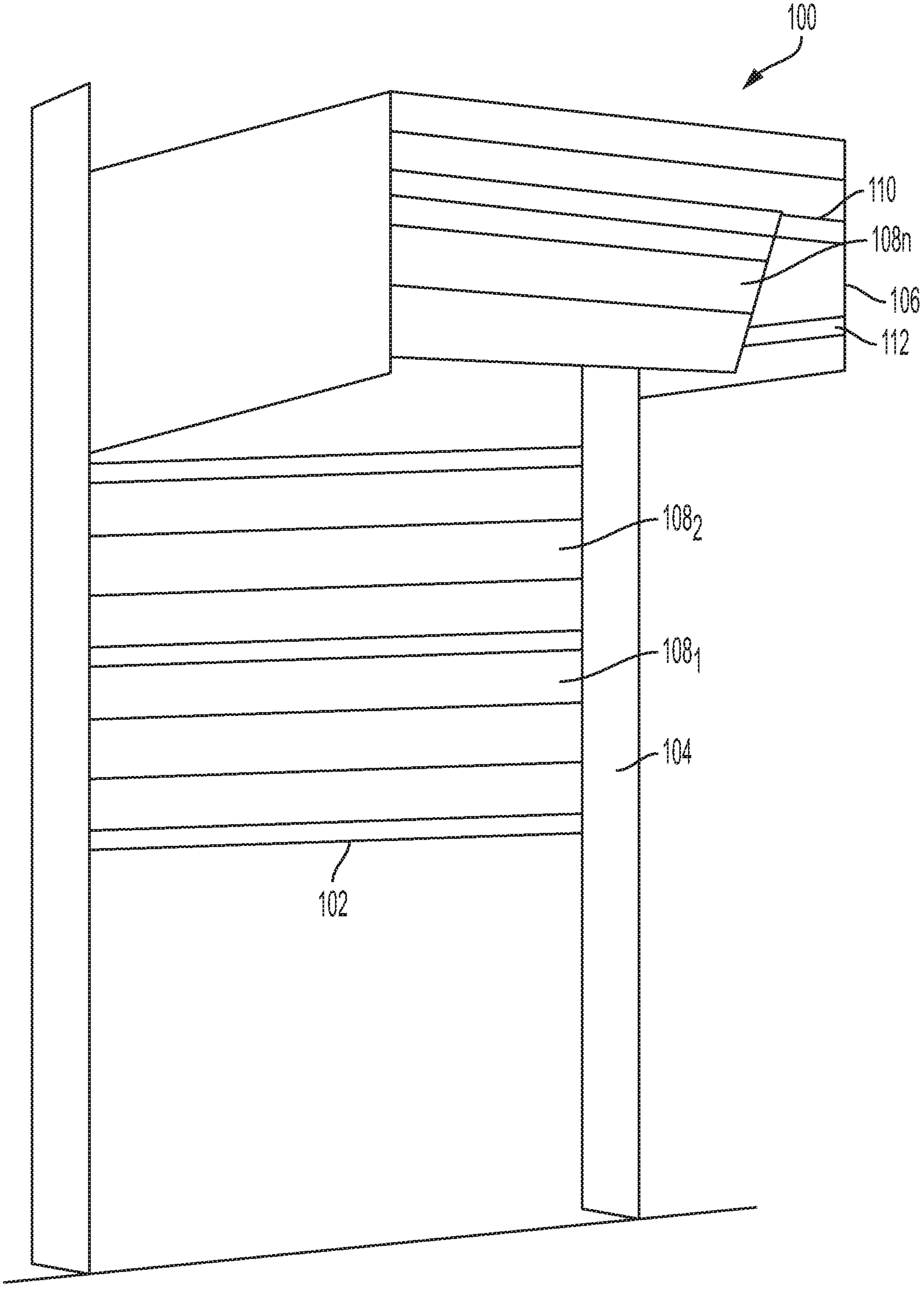
FIG. 1 illustrates an isometric view of an example of the vertically stacking panel door of the present disclosure.

FIG. 1 illustrates an isometric view of an example vertically stacking panel door system 100 of the present disclosure. The vertically stacking panel door system 100 may include a door 102 that is comprised of a plurality of panels $\mathbf{108}_1$ to $\mathbf{108}_n$ (hereinafter also referred to individually as a panel 108 or collectively as panels 108). The door 102 may be opened by moving the panels 108 vertically along a vertical door guide 104. As the panels 108 are separated, the panels 108 can be stacked along a horizontal door guide 106.

In one embodiment, the panels 108 may include end caps (illustrated and discussed in further details below) that include wheels that can move within a first track 110 and a second track 112. The first track 110 and the second track 112 may also be referred to as a top track 110 and a bottom track 112. The first track 110 and the second track 112 may be parallel and positioned at a slight angle to allow for gravity assist when the door 102 is closed.

In one embodiment, the door 102 may be closed by moving the panels 108 towards the vertical door guide 104 one-by-one. The panels 108 may be stacked on top of one another as the door 102 is closed.

Figure 2:
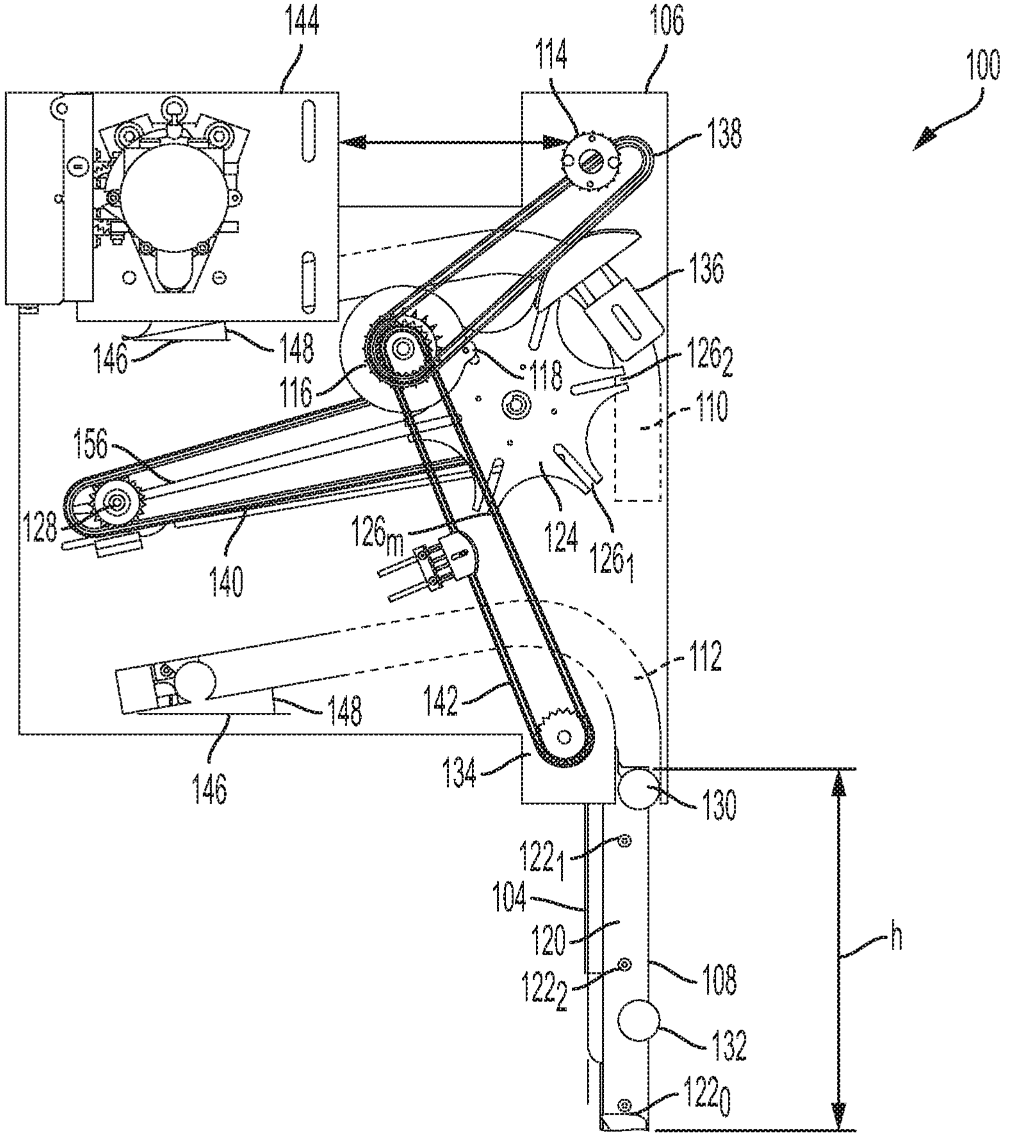
FIG. 2 is a first side view of an example of the vertically stacking panel door of the present disclosure.

FIG. 2 illustrates a first side view of an example of the vertically stacking panel door system 100. The side view of FIG. 2 may illustrate a view of an outer side of the horizontal door guide 106. The side view of FIG. 2 also shows end caps 120 of the panels 108. However, it should be noted that the end caps 120 may be hidden from view by the door jamb and vertical door guide 104 when the vertically panel door system 100 is deployed.

Also, FIG. 2 illustrates the first track 110 and second track 112 in dashed lines. The first track 110 and the second track 112 may be located on the opposite side of the view shown in FIG. 2 and may not be visible from the view illustrated in FIG. 2.

In one embodiment, the horizontal door guide 106 may include a drive shaft 114. The drive shaft 114 may be rotated to operate the various features of the horizontal door guide 106, described below, and to open and close the door 102. The drive shaft 114 may be manually operated (e.g., by an operator using a hand crank, not shown) or automatically operated by a motor 144. The motor 144 may be electrically coupled to the drive shaft 114 to power the drive shaft 114 and automatically open and close the door 102.

In one embodiment, the horizontal door guide 106 may also include a Geneva drive shaft 116, a lifting cam 134, and a support shaft 128. The drive shaft 114 may be mechanically coupled to the Geneva drive shaft 116 via a chain 138.

The lifting cam 134 and the support shaft 128 may be coupled to the Geneva drive shaft 116. For example, a chain 142 may couple the lifting cam 134 to the Geneva drive shaft 116 and a chain 140 may couple the support shaft 128 to the Geneva drive shaft 116.

Figure 3:
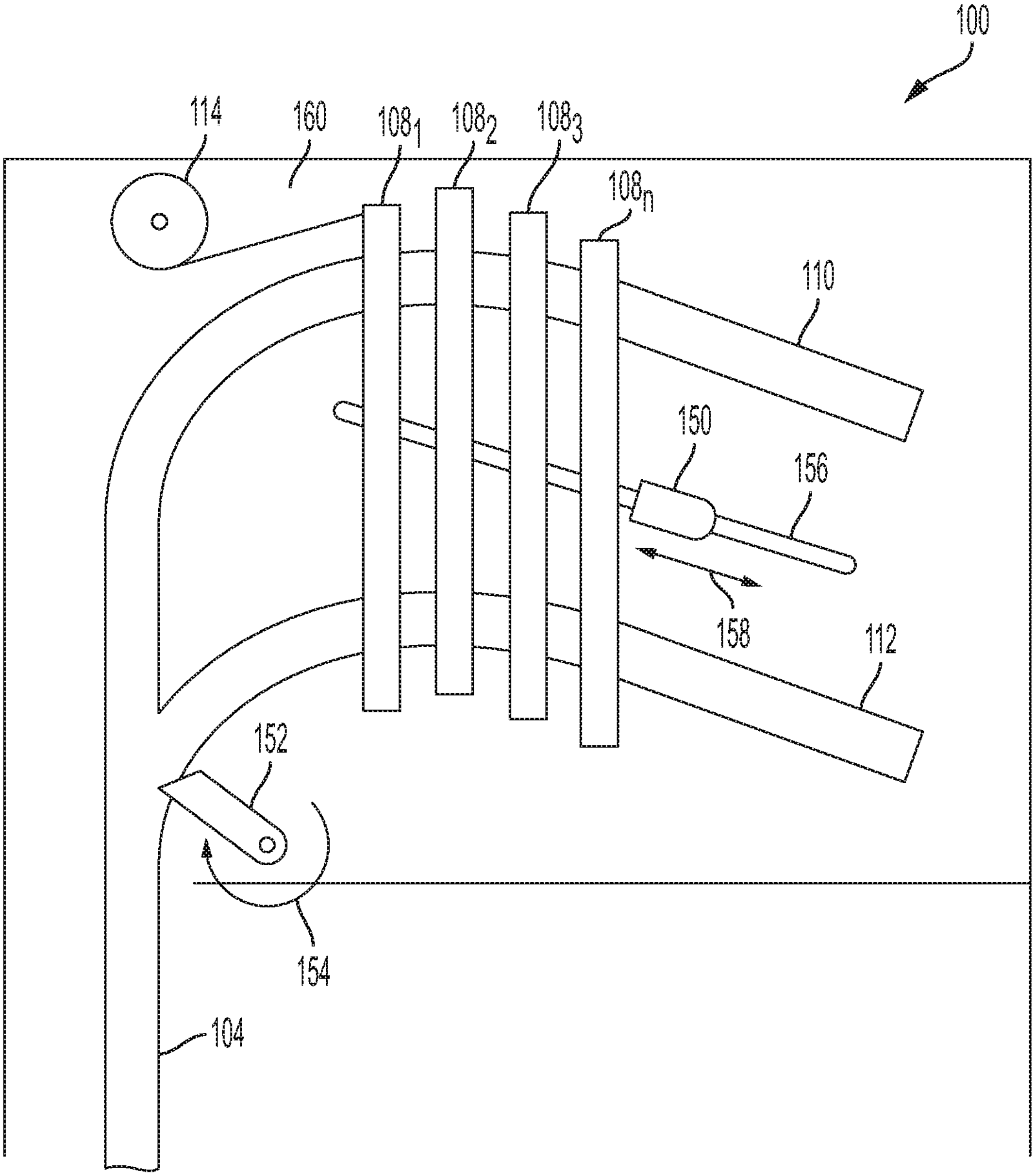
FIG. 3 is a second side view of an example of the vertically stacking panel door of the present disclosure.

Rotation of the Geneva drive shaft 116 may also drive rotation of the lifting cam 134 and the support shaft 128. FIG. 3 illustrates a second side view of an example of the vertically stacking panel door system 100 of the present disclosure. The second side view may represent the opposite side of the view shown in FIG. 2.

FIG. 3 illustrates a panel support block 150 that is coupled to the support shaft 128. Rotation of the support shaft 128 may move the support shaft 128 along a slot 156 in a direction as shown by an arrow 158. The lifting cam 134 may have a lever 152 that may rotate around as shown by an arrow 154. Rotation of the Geneva drive shaft 116 may also cause the lever 152 to rotate via rotation of the lifting cam 134.

In one embodiment, the movement of the support block 150 and rotation of the lever 152 may be a function of a movement of the Geneva drive shaft 116. For example, the Geneva drive shaft 116 may be sized such a single rotation of the Geneva drive shaft 116 may be equivalent to a single 360 degree rotation of the lever 152 and a desired amount of movement of the support block 150 along the slot 156. In addition, a single rotation of the lever 152 may be approximately equal to a height "h" illustrated in FIG. 2 of a panel 108.

In one embodiment, the support block 150 may control movement of the panels 108 along the first track 110 and the second track 112. For example, referring back to FIG. 2, the first track 110 and the second track 112 may have an angle that is biased towards the ground. FIG. 2 illustrates an angle 148 of the first track 110 and the second track 112 relative to a plane 146 that is parallel to the ground. Thus, when the panel 108 slides into the first track 110 and the second track 112, the panel 108 may slide towards the end of the first track 110 and the second track 112 naturally via gravity.

The support block 150 may help control that gravitational movement to prevent the panels 108 from slamming into one another. For example, the support block 150 may keep the panels 108 towards an apex of a curve of the first track 110 and the second track 112. Thus, subsequent panels 108 that enter the first track 110 and the second track 112 may gently rest against the previous panels 108 that are already in the first track 110 and the second track 112.

In addition, the support block 150 may help to push each panel 108 out of the horizontal door guide 106 when the door 102 is closed. As noted above, the first track 110 and the second track 112 may be angled towards the ground. Thus, without the support block 150, it may be difficult to pull the panels 108 out of the horizontal door guide 106 to close the door 102.

In one embodiment, the lever 152 may be rotated to help create lift and separation between adjacent end caps 120 of the panel 108. For example, referring back to FIG. 2, each panel 108 may include an end cap 120. In one embodiment, the end cap 120 may be coupled to opposite sides of the panel 108. In other words, each panel 108 may have a first end cap 120 on the right side and a second end cap 120 on the left side.

Figure 7:
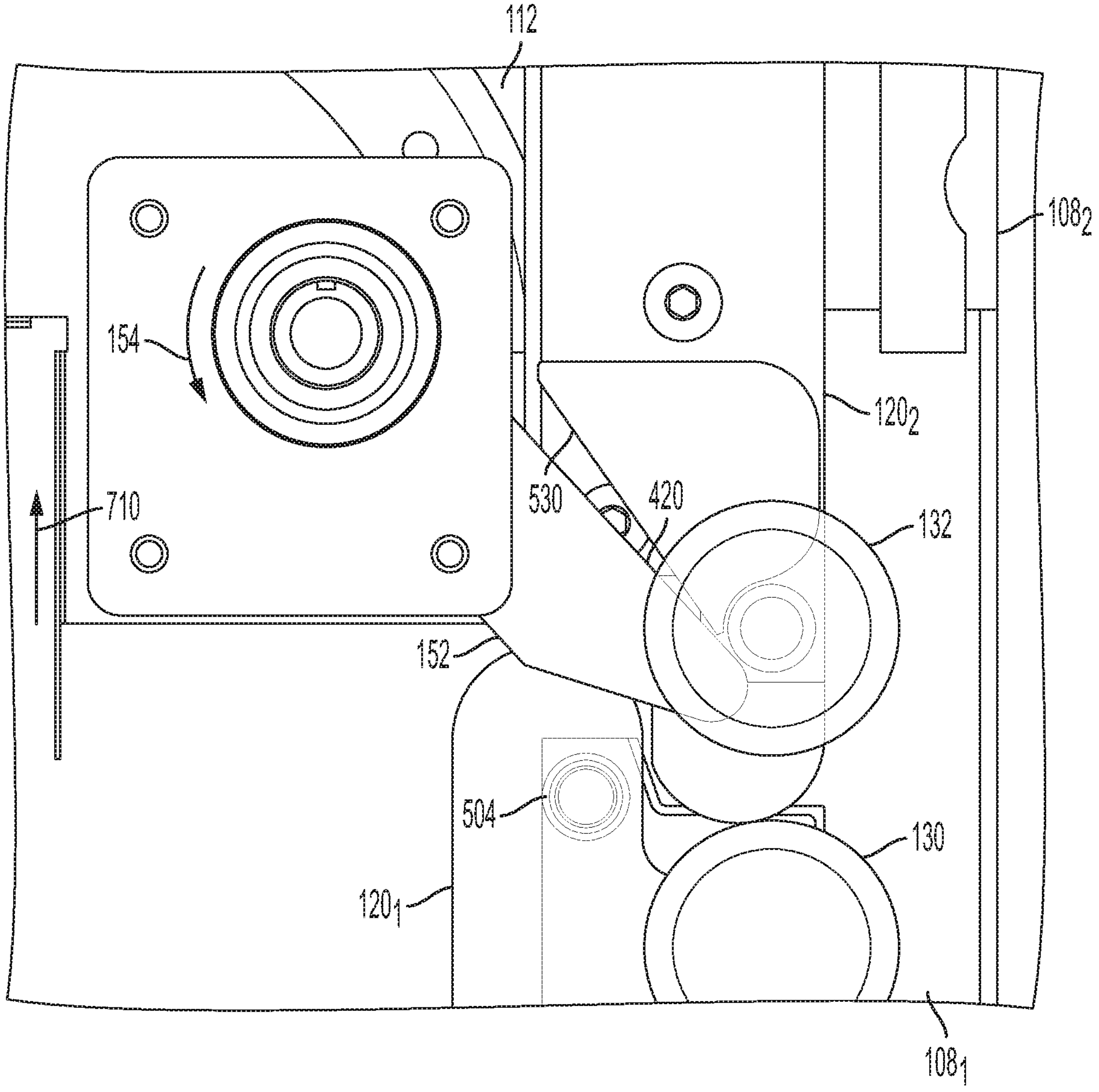
FIG. 7 is a close up side view of an example interaction between two adjacent panels of the present disclosure at a starting point of lifting.
Figure 8:
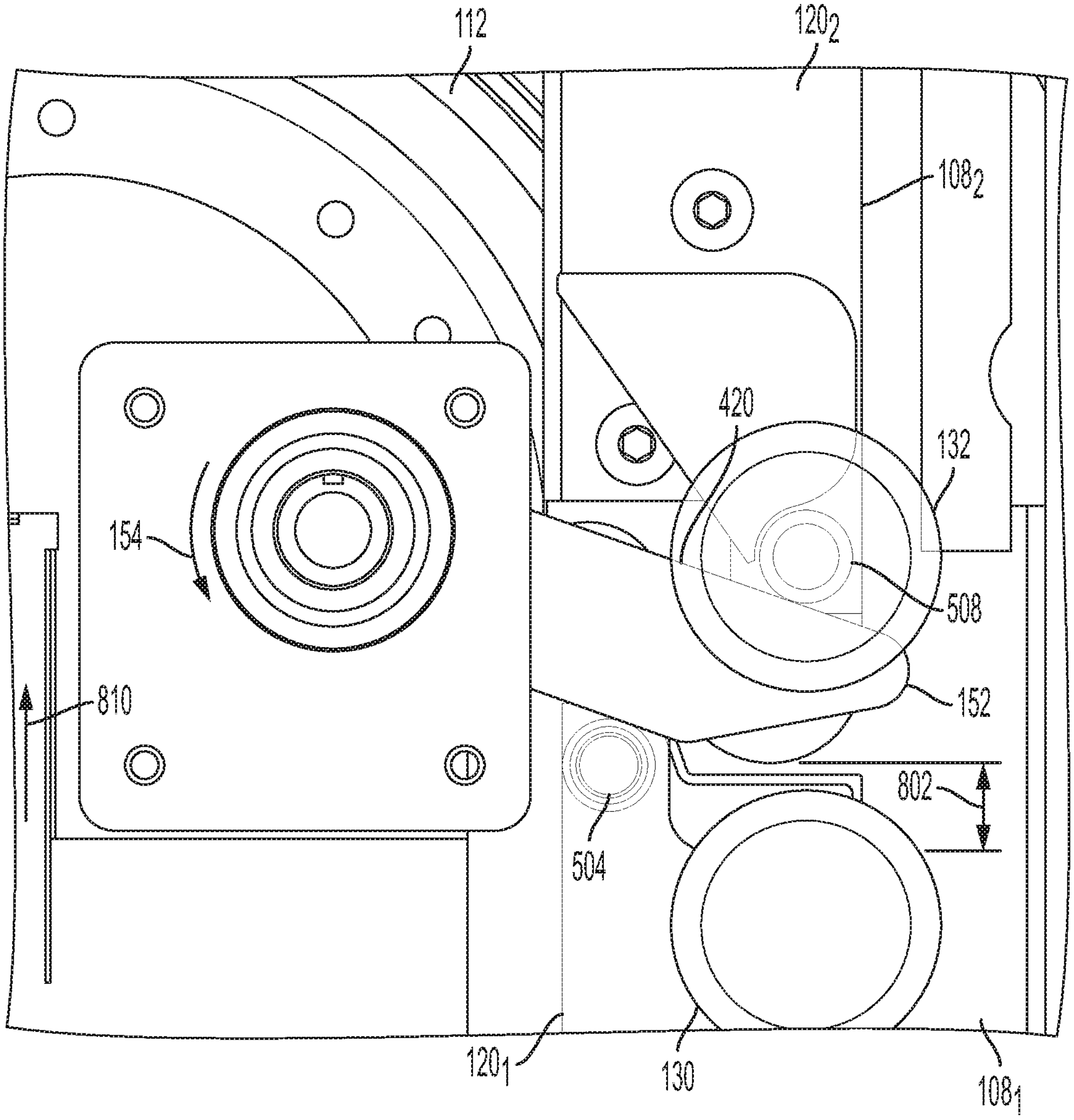
FIG. 8 is a close up side view of an example interaction between two adjacent panels of the present disclosure as the lifting cam is rotated to lift an adjacent panel.
Figure 9:
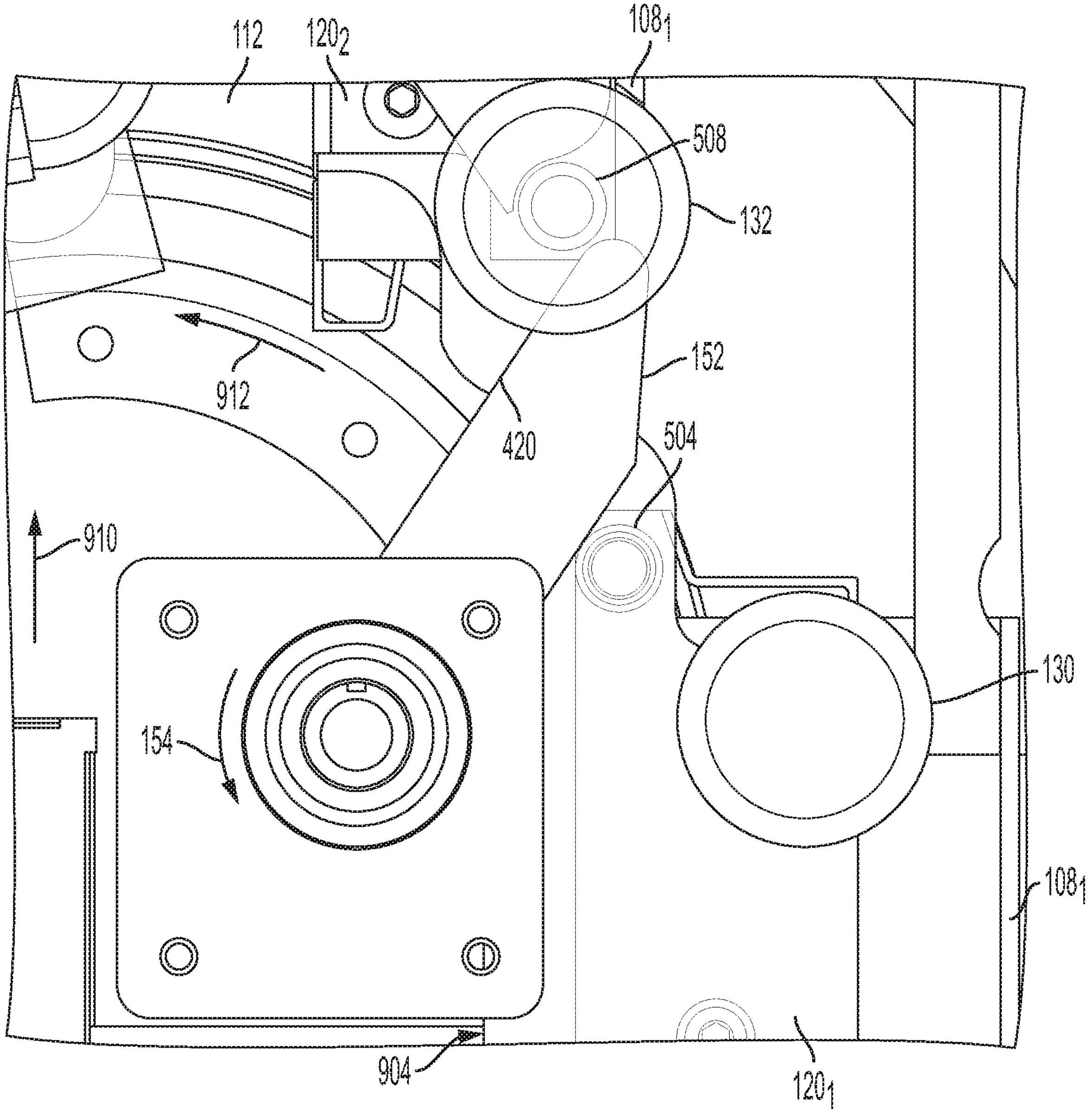
FIG. 9 is a close up side view of an example of the adjacent panel that is lifted and transitioned to a horizontal door guide of the present disclosure.

In one embodiment, the end cap 120 may include a first track wheel 130 and a second track wheel 132. The first track wheel 130 and the second track wheel 132 may be coupled towards opposite ends of the end cap 120. The first track wheel 130 and the second track wheel 132 may be coupled to the end cap 120 via a shaft or bar. In one embodiment, the lever 152 may slide between the second track wheel 132 of a first panel 108 and the first track wheel 130 of a second panel 108 below the first panel 108. As the lever 152 rotates, the lever 152 may press against the bar or shaft of the second track wheel 132 of the first panel 108 to lift and separate the first panel 108 from the second panel 108. As the lever 152 continues to rotate, the lever 152 may push the first panel 108 horizontally into the first track 110 and the second track 112 in the horizontal door guide 106. A more detailed example of how the lever 152 may operate between two adjacent panels 108 is illustrated in FIGS. 7-9, and discussed in further details below.

In one embodiment, the end caps 120 may also include a plurality of mechanical fasteners 122-122$_o$ (hereinafter also referred to individually as a fastener 122 or collectively as fasteners 122). The mechanical fasteners 122 may be screws, nails, and the like, that may couple the end cap 120 to the panel 108.

In one embodiment, the Geneva drive shaft 116 may include a rotating drive wheel 118 that includes a pin and a driven wheel 124. The driven wheel 124 may include a plurality of slots 126$_1$ to 126$_m$ (hereinafter also referred to individually as a slot 126 or collectively as slots 126). The slots 126 may be spaced apart at a distance that is equivalent to a desired amount of movement of the support block 150. For example, the radial distance between two slots 126 may be approximately equal to a desired amount of linear movement (e.g., along the slot 150) for the support block 150.

The distance between two slots 126 may also be approximately equal to one full rotation or revolution of the rotating drive wheel 118. Thus, the pin of the rotating drive wheel 118 may enter a slot 126. One full rotation of the rotating drive wheel 118 may rotate the driven wheel 124 a radial amount to place the pin of the rotating drive wheel 118 into the next slot 126 of the driven wheel 124.

In one embodiment, the horizontal door guide 106 may include a belt tensioner 136. The belt tensioner 136 may be located against the chain 138 between the drive shaft 114 and the Geneva drive shaft 116. The belt tensioner 136 may be manipulated to maintain a desired amount of tension on the chain 138.

Referring back to FIG. 3, FIG. 3 also illustrates how the bottom most panel 108 (e.g., panel 108$_1$ in the example illustrated in FIG. 3) is coupled to the drive shaft 114 via a cable 160. Thus, as the drive shaft 114 rotates to open the door 102, the bottom most panel 108, may push the other panels 108$_2$ to 108$_n$ vertically up the vertical door guide 104 and towards the horizontal door guide 106.

Figure 4:
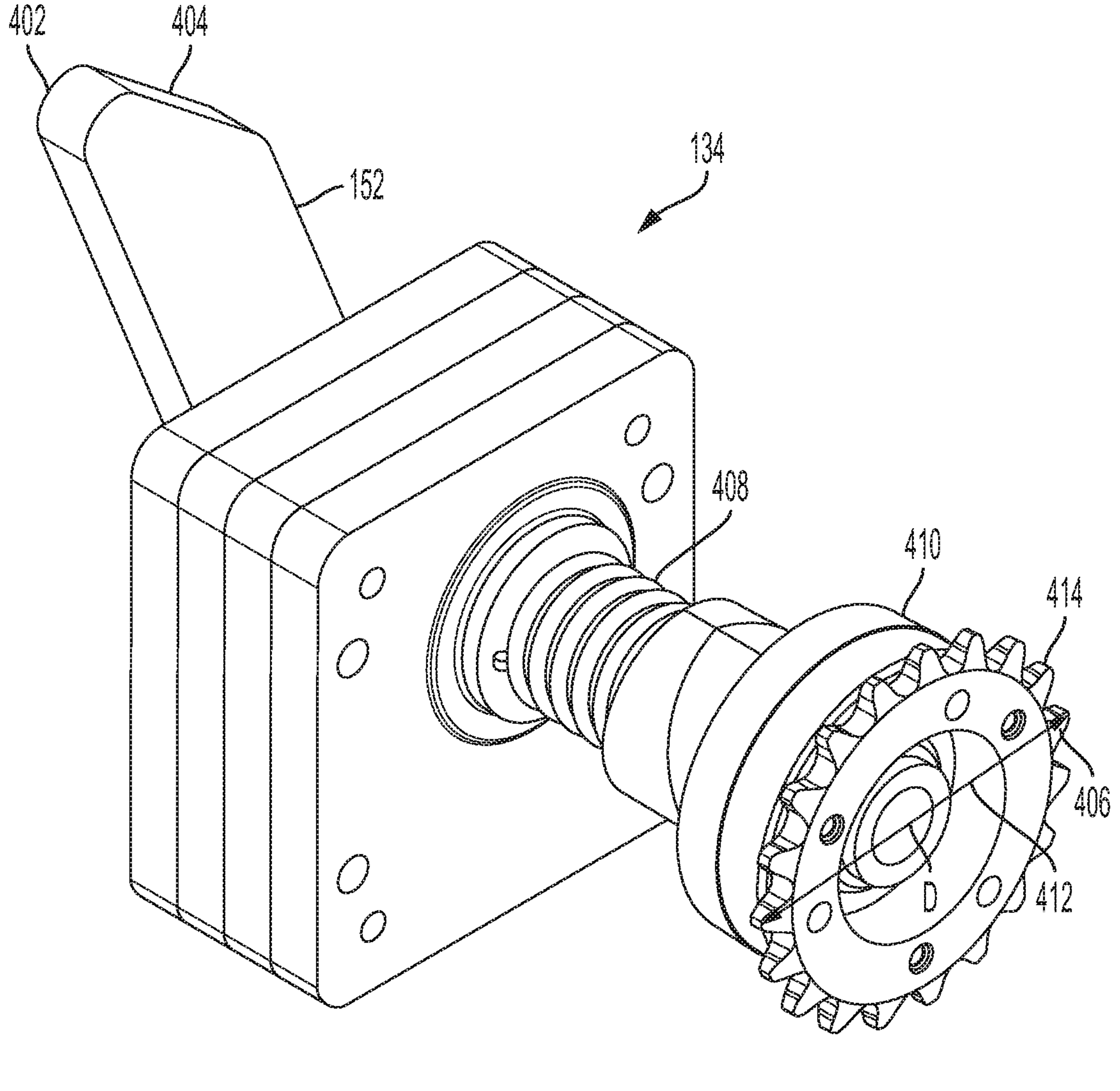
FIG. 4 is an isometric view of an example lifting cam of the present disclosure.

FIG. 4 illustrates a more detailed isometric view of the lifting cam 134. In one embodiment, the lifting cam 134 may include a gear 406 having a plurality of teeth 414 to catch openings in the chain 142. Thus, as the Geneva drive shaft 116 rotates, the chain 142 may move and cause the gear 406 to rotate, thereby also rotating the lever 152 coupled to the gear 406.

In one embodiment, the gear 406 may have diameter (D), as measured along a line 412. The diameter of the gear 406 may be sized such that one full rotation of the gear 406, at a particular radial velocity, may be approximately equal to a height of the panel 108. Thus, the Geneva drive shaft 116 may be driven at a speed such that one full rotation of the gear 406 may be approximately equal to a linear distance traveled by the panel 108 that is approximately equal to the height of the panel 108. Said another way, the velocity at which the gear 406 is driven and the diameter of the gear 406 may be such one full rotation of the lever 152 may cause the lever 152 to be inserted between a subsequent pair of adjacent panels 108, as the door 102 is opening vertically.

In one embodiment, the lever 152 may include a shape that includes a point 402 and a slanted surface 404. The point 402 may allow the lever 152 to fit between the first track wheel 130 and the second track wheel 132 of adjacent panels 108. The slanted surface 404 may be angled to provide tolerance to allow the lever 152 to fit between two adjacent panels 108. The slanted surface 404 may also allow the lever 152 to provide smoother movement of the panels 108 vertically and then horizontally into the horizontal door guide 106 as the lever 152 is rotated.

In one embodiment, the lever 152 may be spring flexed via a spring 408. As a result, the lever 152 may be provided with some tolerance to fit between the second track wheel 132 and the first track wheel 130 of adjacent panels 108. In other words, if the size of the gear 406 and the velocity at which the gear 406 is driven are not exactly equal to a linear distance that is equal to the height of the panel 108, the spring flex of the lever 152 may allow for some tolerance.

In one embodiment, the gear 406 may be coupled to a slip clutch 410. The slip clutch 410 may be a two-way slip clutch. The slip clutch 410 may control the amount of torque that is applied to the gear box of the lifting cam 134 in both directions (e.g., when the door 102 is opening and closing). The slip clutch 410 may also provide some tolerance for the geometry of the end caps 120 to be out of time.

Figure 5:
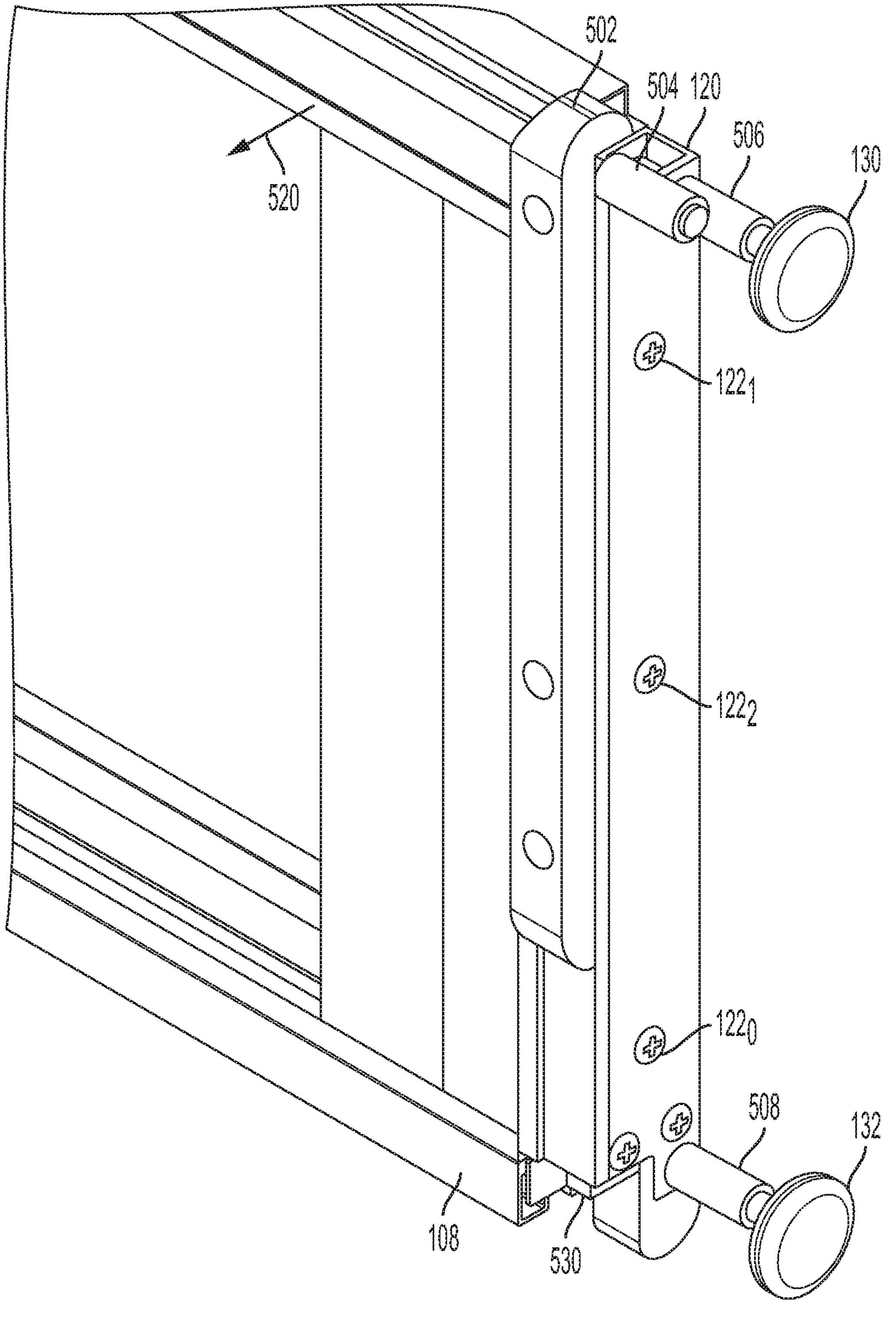
FIG. 5 is an isometric view of an example end cap of the present disclosure.

FIG. 5 illustrates an isometric view of an example end cap 120 of the present disclosure. FIG. 5 illustrates the end cap 120 coupled to the panel 108 via the mechanical fasteners 122$_1$-122$_o$. The end cap 120 may also include the first track wheel 130 and the second track wheel 132, described above. In one embodiment, the first track wheel 130 may be coupled by a bar 506 to the end cap 120. The second track wheel 132 may be coupled by a bar 508 to the end cap 120.

In one embodiment, when describing the lifting and separating action provided by the lever 152, the lever 152 may contact the bar 506 and the bar 508. In other words, in the examples described above that describe how the lever 152 contacts the first track wheel 130 to lift and separate the first end panel 108$_1$ from the second end panel 108$_2$, the lever 152 may actual contact the bar 506 of the first track wheel 130.

In one embodiment, the first track wheel 130 and the second track wheel 132 may be located on opposite ends of the end cap 120. For example, the first track wheel 130 may be located approximately in the center of the end cap 120 towards a top end of the end cap 120. The second track wheel 132 may be located approximately in the center of the end cap 120 towards a bottom end of the end cap 120. The first track wheel 130 and the second track wheel 132 may be located on a common line that may run through a center of the end cap 120 along a length of the end cap 120.

In one embodiment, the first track wheel 130 and the second track wheel 132 may be fabricated from a plastic or rubber material to minimize an amount of noise created when the door 102 is opened and closed. In one embodiment, the first track wheel 130 and the second track wheel 132 may be fabricated from nylon. The first track wheel 130 and the second track wheel 132 may rotate to reduce friction when moving within the vertical door guide 104 and the horizontal door guide 106. However, fabricating the track wheels 130 and 132 with plastic may allow the track wheels 130 and 132 to slide in the event that one of the track wheels 130 and 132 become stuck rotationally (e.g., fails to rotate or spin).

In one embodiment, the end cap 120 may include an extended portion 502. The extended portion 502 may be located near the top end of the end cap 120. The extend portion 502 may extend towards a back side of the panel 108 (e.g., a direction towards an interior of a building as shown by an arrow 520). A pin 504 may be coupled to the extended portion 502. In one embodiment, the pin 504 may provide a surface for the lever 152 to apply force to perform the lifting and separation. The pin 504 may be used to prevent damage to the first track wheel 130 or to prevent the bar 506 from being bent out of alignment with the vertical door guide 104. In one embodiment, a second pin 504 may also be located adjacent to the second track wheel 132 towards a bottom end of the end cap 120.

In one embodiment, the extended portion 502 may also include a surface 530. The surface 530 may be angled to allow the lever 152 to fit between two adjacent end caps 120 as the lever 152 is rotated. The surface 530 may interact with a surface of the lever 152 to create separation between two adjacent end caps 120, as illustrated in FIGS. 7-9 and discussed in further details below.

In one embodiment, the extended portion 502 may also provide spacing between the panels 108, when they are vertically stacked in the horizontal door guide 106. For example, the extended portion 502 may ensure a desired amount of spacing between adjacent panels 108 in the horizontal door guide 106. The extended portion 502 may also ensure that the panels 108 are hanging parallel to one another and that the panels 108 are not angled when in the horizontal door guide 106.

The extended portion 502 may also be fabricated from a plastic or rubber. The extended portion 502 may help reduce or dampen noise created when a panel 108 slides down the horizontal door guide 106 and contacts another panel 108 already stacked in the horizontal door guide 106.

Figure 6:
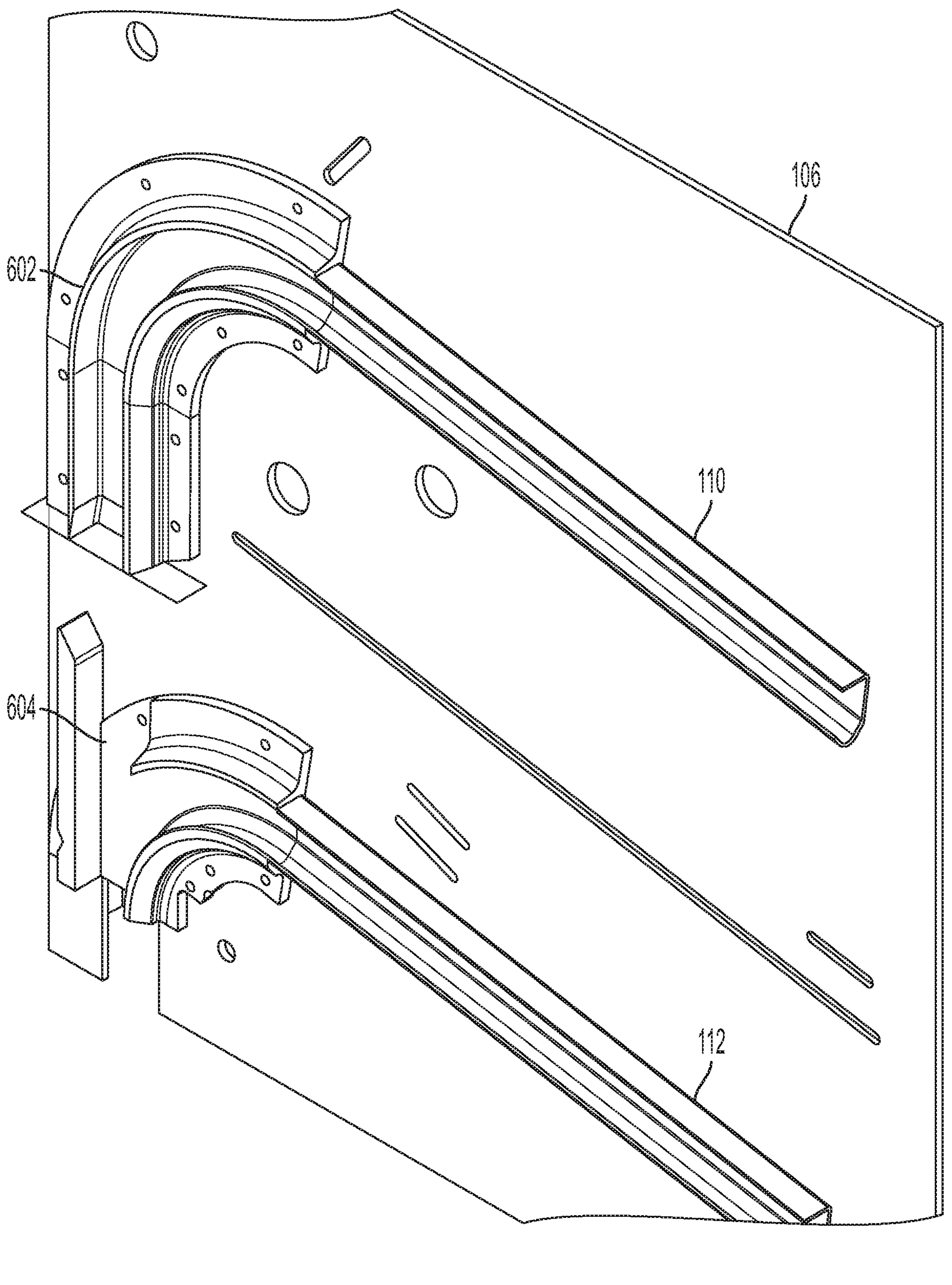
FIG. 6 is an isometric side view of one side of the tracks in a horizontal door guide of the present disclosure.

FIG. 6 illustrates an example of the horizontal door guide 106. FIG. 6 illustrates the first track 110 and the second track 112. In one embodiment, an injection molded radius 602 and an injected molded radius 604 may be coupled to the first track 110 and the second track 112, respectively. The injection molded radii 602 and 604 may allow the panels 108 to transition from the vertical door guide 104 to the first track 110 and the second track 112, in the horizontal door guide 106.

As the door 102 is pulled up vertically to open, and after the lever 152 separates and lifts an adjacent panel 108, the panel 108 may continue up into the injection molded radius 602. As the first track wheel 130 begins to curve towards the first track 110, the second track wheel 132 may move similarly in the injection molded radius 604 towards the second track 112.

FIGS. 7-9 illustrate example side views of an interaction between two adjacent panels 108$_1$ and 108$_2$ at different times during operation of lever 152. FIG. 7 illustrates a view at a point in time when the lever 152 has entered between the first track wheel 130 and the second track wheel 132 of adjacent panels 108$_1$ and 108$_2$. In FIG. 7, the panel 108$_2$ may be coupled to, or resting on top of, the panel 108$_1$. The lever 152 may continue to rotate in a radial direction as shown by the arrow 154 as the panels 108$_1$ and 108$_2$ continue to move in a vertical direction shown by an arrow 710. The lever 152 may rotate at a velocity that is approximately equal to a linear velocity at which the panels 108$_1$ and 108$_2$ are moving vertically in the direction along the arrow 710.

In one embodiment, as the lever 152 rotates, the lever 152 may contact the pin 504. The spring flex of the lever 152 (as described above) may provide tolerance for the lever 152 to move in between the pin 504 and the surface 530. Initially, the surface 530 may contact a side 420 of the lever 152.

FIG. 8 may represent a moment in time after the time illustrated in FIG. 7. As the lever 152 continues to rotate, the surface 530 may move up the side 420 of the lever 152 and the lever 152 may contact the second track wheel 132 of the panel 108$_2$ (e.g., via the bar 508, illustrated in FIG. 5). The movement of the surface 530 up the side 420 of the lever 152 as the lever 152 rotates may cause the panel 108$_2$ to lift and separate from the panel 108$_1$ by a distance as shown by a line 802 as the panels 108$_1$ and 108$_2$ move vertically in the direction shown by an arrow 810.

FIG. 9 may represent a moment in time after the time illustrated in FIG. 8. As the lever 152 continues to rotate, the lever 152 may push the panel 108$_2$ into the first track 110 (not shown in FIG. 9) and the second track 112. For example, the lever 152 may push the panel $108_2$ in a horizontal direction into the horizontal door guide 106, as shown by an arrow 912.

In one embodiment, the panel $108_1$ may continue to move vertically upwards in the direction shown by an arrow 910. At a moment in time, the side 420 may no longer contact the panel $108_2$. The lever 152 may transfer control of the panel $108_2$ to the panel $108_1$. For example, at the time the side 420 no longer contacts the panel $108_2$, the backside of the panel $108_1$ (e.g., the backside of the extended portion 502) may contact the panel $108_1$. The panel $108_1$ may continue to move upward and push the panel $108_2$ further into the first track 110 and the second track 112.

As noted above, the lever 152 may be rotated at a speed that allows the lever 152 to return to a position between the second track wheel 132 and the first track wheel 130 of adjacent panels 108. In other words, as the panel $108_1$ continues to move vertically upwards, the lever 152 may return to the position illustrated in FIG. 7 to lift and separate two subsequent adjacent panels 108. Thus, the images in FIG. 7-9 may be repeated until all of the panels 108 are vertically stacked in the horizontal door guide 106.

In one embodiment, the operation may move in the opposite direction to close the door 102. For example, the lever 152 may rotate in a radial direction opposite the arrow 154 to move the panels 108 out of the horizontal door guide 106 and towards the vertical door guide 104. The lever 152 may help push the panels 108 down into the vertical door guide 104 as the panels 108 are lowered by the drive shaft 114. The support block 150 may help to move one panel 108 at a time towards the lever 152 and out of the horizontal door guide 106. Thus, the rotation of the lever 152 and the movement of the support block 150 may be timed or synchronized to move together via the Geneva drive shaft 116.

Thus, the present disclosure provides a vertically stacking panel door system that uses a lifting cam that works with end caps on panels of the vertically stacking panel door. The horizontal door guide may include various drive shafts and gears that control rotation of a lever on the lifting cam that may lift and separate adjacent panels of the door.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A horizontal door guide for a vertically stacking door, comprising:

a first track and a second track to vertically stack panels of the vertically stacking door along a horizontal line;

a drive shaft coupled to a bottom most panel of the panels to lift the vertically stacking door vertically;

a Geneva drive shaft coupled to the drive shaft; and a lifting cam coupled to the Geneva drive shaft, wherein the lifting cam comprises a rotating lever to separate and lift adjacent panels of the panels of the vertically stacking door as the vertically stacking door is opened in a vertical direction by the drive shaft and to push the panels into the first track and the second track, wherein the rotating lever comprises a spring flex allowing rotation of the rotating lever relative to a drive member of the lifting cam during operation to provide a tolerance for timing an insertion between pins of the adjacent panels.

2. The horizontal door guide of claim 1, further comprising:

a panel support block coupled to a support shaft, wherein the support shaft is coupled to the Geneva drive shaft.

3. The horizontal door guide of claim 2, wherein the Geneva drive shaft comprises:

a rotating drive wheel comprising a pin; and a driven wheel comprising a plurality of slots that receives the pin to be rotated by the rotating drive wheel, wherein the support shaft is coupled to the driven wheel of the Geneva drive shaft.

4. The horizontal door guide of claim 1, wherein the rotating lever comprises an angled surface, wherein the angled surface is to fit between the pins of the adjacent panels to create separation and lift.

5. The horizontal door guide of claim 1, wherein the lifting cam comprises a slip clutch.

6. The horizontal door guide of claim 1, wherein a diameter of a gear of the lifting cam is sized such that a single rotation of the gear is equivalent to a height of a panel of the panels of the vertically stacking door.

7. The horizontal door guide of claim 1, wherein the drive shaft, the Geneva drive shaft and the lifting cam are coupled via respective chains around respective gears.

8. The horizontal door guide of claim 1, further comprising:

a belt tensioner placed against a chain that connects the Geneva drive shaft and the drive shaft.

9. The horizontal door guide of claim 1, wherein the drive shaft is operated manually or automatically via a drive motor.

10. A vertical panel door stacking system, comprising:

a door, comprising a first panel and a second panel, wherein the first panel and the second panel each comprise an endcap coupled on opposite sides of the first panel and the second panel, wherein each endcap comprises:

a first track wheel and a second track wheel;

a vertical door guide, wherein the first track wheel and the second track wheel of the endcap of the first panel and the first track wheel and the second track wheel of the endcap of the second panel are capable of moving vertically inside of the vertical door guide; and a horizontal door guide comprising:

a first track;

a second track; and a lifting cam to separate and lift the first panel from the second panel and to move the first panel such that the first track wheel of the end cap of the first panel enters the first track and the second track wheel of the end cap of the first panel enters the second track, wherein the lifting cam comprises a rotating lever that comprises a spring flex allowing rotation of the rotating lever relative to a drive member of the lifting cam during operation to provide a tolerance for timing an insertion between pins of the first panel and the second panel.

11. The vertical panel door stacking system of claim 10, wherein the rotating lever is timed to rotate such that the rotating lever is inserted between the second track wheel of the endcap of the first panel and the first track wheel of the endcap of the second panel to create separation and lift.

12. The vertical panel door stacking system of claim 10, wherein the horizontal door guide further comprises:

a drive shaft to lift the door vertically along the vertical door guide;

a Geneva drive shaft coupled to the drive shaft; and a panel support block coupled to a support shaft, wherein the support shaft is coupled to the Geneva drive shaft, wherein the panel support block moves along a slot in the horizontal door guide to keep the first panel and the second panel towards an apex of a curve of the first track and the second track to control gravitational movement of the first panel and the second panel as the first panel and the second panel enter the horizontal door guide when the drive shaft is operated to open the door.

13. The vertical panel door stacking system of claim 12, wherein the first track and the second track are angled towards a floor.

14. The vertical panel door stacking system of claim 13, wherein the panel support block provides a force to push the first panel and the second panel towards the vertical door guide when the drive shaft is operated to close the door.

* * * * *